(12) United States Patent
Kaneko et al.

(10) Patent No.: US 6,424,447 B1
(45) Date of Patent: Jul. 23, 2002

(54) OPTICAL SCANNING DEVICE

(75) Inventors: Koji Kaneko; Mitsuhiro Ohno, both of Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/536,699

(22) Filed: Mar. 28, 2000

(30) Foreign Application Priority Data

Mar. 30, 1999 (JP) .......................................... 11-087870

(51) Int. Cl.[7] .............................................. G02B 26/08
(52) U.S. Cl. ...................................... 359/216; 359/212
(58) Field of Search ................................ 359/216, 217, 359/218, 212, 196, 197, 213, 223, 226

(56) References Cited

U.S. PATENT DOCUMENTS

| | | | | |
|---|---|---|---|---|
| 4,469,430 A | * | 9/1984 | Terashima | 355/3 R |
| 5,171,984 A | * | 12/1992 | Van Rosmalen | 359/216 |
| 5,438,447 A | * | 8/1995 | Kunii | 359/200 |
| 5,901,000 A | * | 5/1999 | Fish et al. | 359/896 |

FOREIGN PATENT DOCUMENTS

| | | | | |
|---|---|---|---|---|
| EP | 0 866 351 A1 | * | 9/1998 | G02B/7/182 |
| JP | 5-341221 A | | 12/1993 | |
| JP | 6-43379 A | | 2/1994 | |

* cited by examiner

Primary Examiner—Cassandra Spyrou
Assistant Examiner—Euncha Cherry
(74) Attorney, Agent, or Firm—Young & Thompson

(57) ABSTRACT

An optical scanning device for scanning a subject medium with a scanning beam that is oscillated by a polygon mirror along a straight line on the subject medium is provided with a rotational speed variation restraint partition which operates to restrain an occurrence of momentary rotational speed variations of the polygon mirror due to turbulence of a current of air that are caused by high speed rotation of the polygon mirror.

12 Claims, 8 Drawing Sheets

OPTICAL SCANNING DEVICE

BACKGROUND OF THE INVENTION

1. Field of the Invention

The present invention relates to improvements in an optical scanning device for scanning a subject medium.

2. Description of the Related Art

In recent years, with development of digital techniques and light sources, numerous high performance printing equipment and the like have been developed, wherein a light beam modulated according to image signals scans a subject matter, such as photographic pictures and printed matter (which is hereafter referred to as a scanning subject medium), that is sensitive to light to record an image on a paper. In such a printing equipment, the utilization is made of an optical scanning device to scan a scanning subject medium. This optical scanning device is, for typical example, configured such that a laser beam from a laser diode is repeatedly reflected and deflected by a rotary polygon mirror so as to thereby oscillate along a line on a subject medium The polygon mirror rotates at a high speed and, in consequence, generates a current of air therearound. In the case where the polygon mirror is installed in a dust proof chamber formed somewhat hermetic or even in the case where the polygon mirror is installed in an open space, The current of air strikes various parts arranged in a disorderly fashion around the polygon mirror and causes turbulence flows of air. The polygon mirror causes momentary rotational speed variations due to the turbulence flows of air, which always provides aggravation of scanning precision. In order to eliminate an occurrence of rotational speed variation of the polygon mirror due to turbulence flows of air, it is thought to disposed the polygon mirror in a spacious place where nothing interrupts a current of air generated by the polygon mirror, however, this is opposed to a recent tendency toward overall compactness of the optical scanning device.

SUMMARY OF THE INVENTION

It is an object of the present invention to provide a compact optical scanning device which restrains rotational speed variations of a polygon mirror that is caused due to turbulence of a current of air generated by high speed rotation of the polygon mirror.

The foregoing object of the present invention is accomplished by an optical scanning device for scanning a subject medium with a scanning beam that is oscillated by a polygon mirror along a straight line on the subject medium which is provided with rotational speed variation restraint means comprising a substantially cylindrical partition having a number of corrugations and is placed so as to surround the polygon mirror by the corrugations, thereby restraining momentary rotational speed variations of the polygon mirror.

According to the result of experimental tests on rotational speed variations of the polygon mirror that were made by the inventors of this application, it has been proved that the corrugated cylindrical partition effectively restrains an occurrence of turbulence air flows that is possibly caused by high speed rotation of the polygon mirror.

BRIEF DESCRIPTION OF THE DRAWINGS

The above and other objects and features of the present invention will be more apparent from the following detailed description in connection with a preferred embodiment thereof when reading in conjunction with the accompanying drawings, in which.

DETAILED DESCRIPTION OF THE INVENTION

Figure 1:
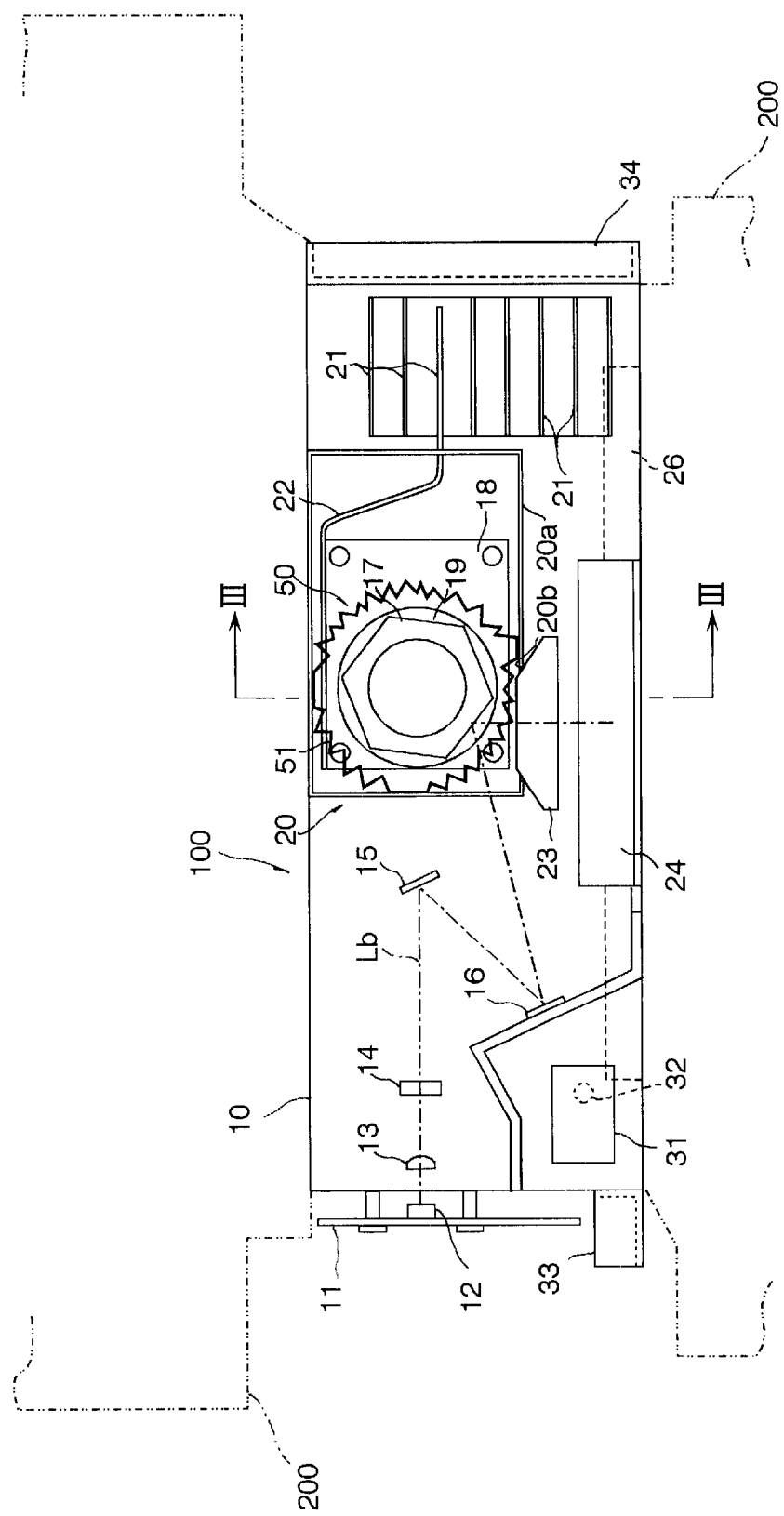
FIG. 1 is a top view of an optical scanning device with a top cover removed away.
Figure 2:
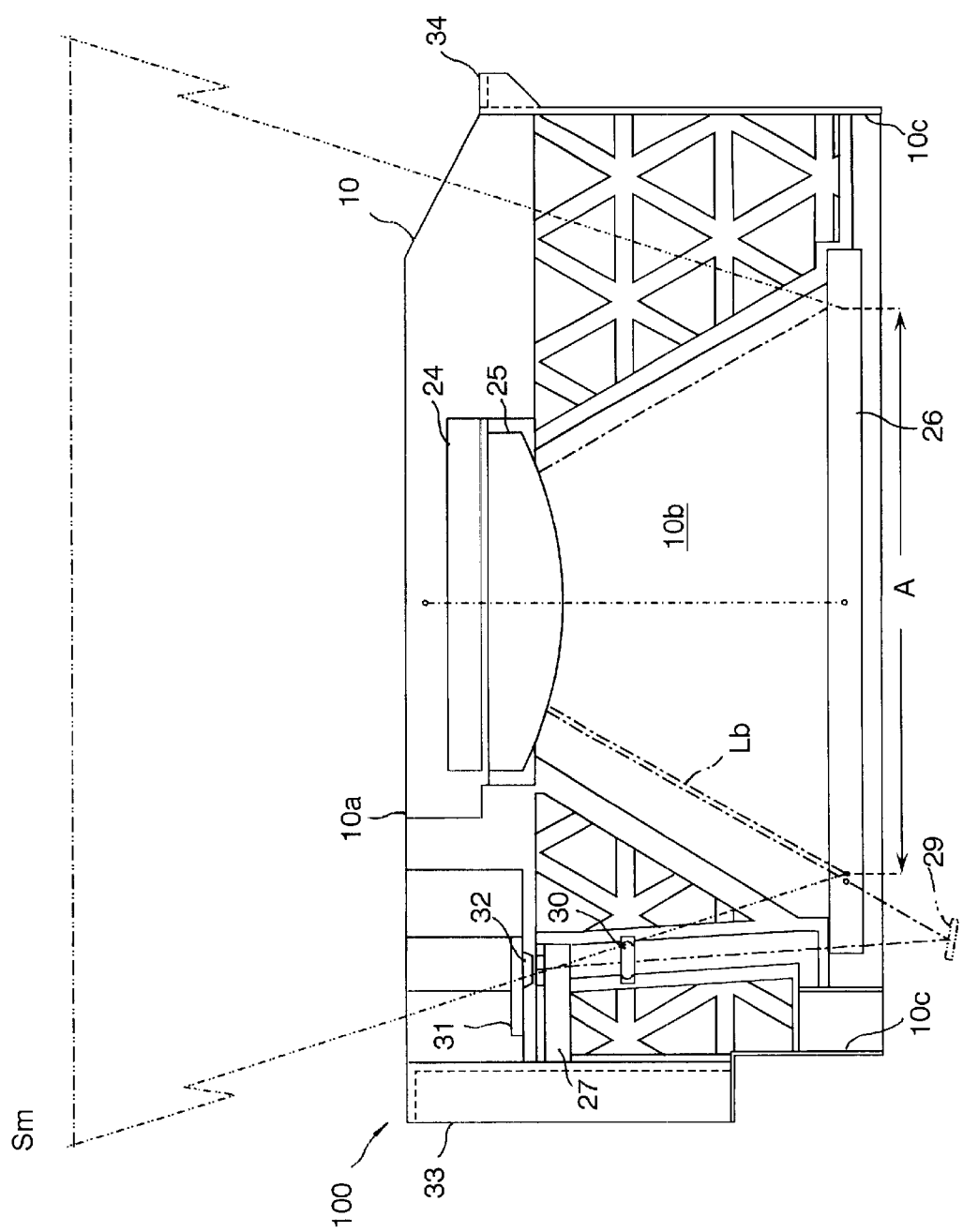
FIG. 2 is a front view of the optical scanning device with a top cover removed away.
Figure 3:
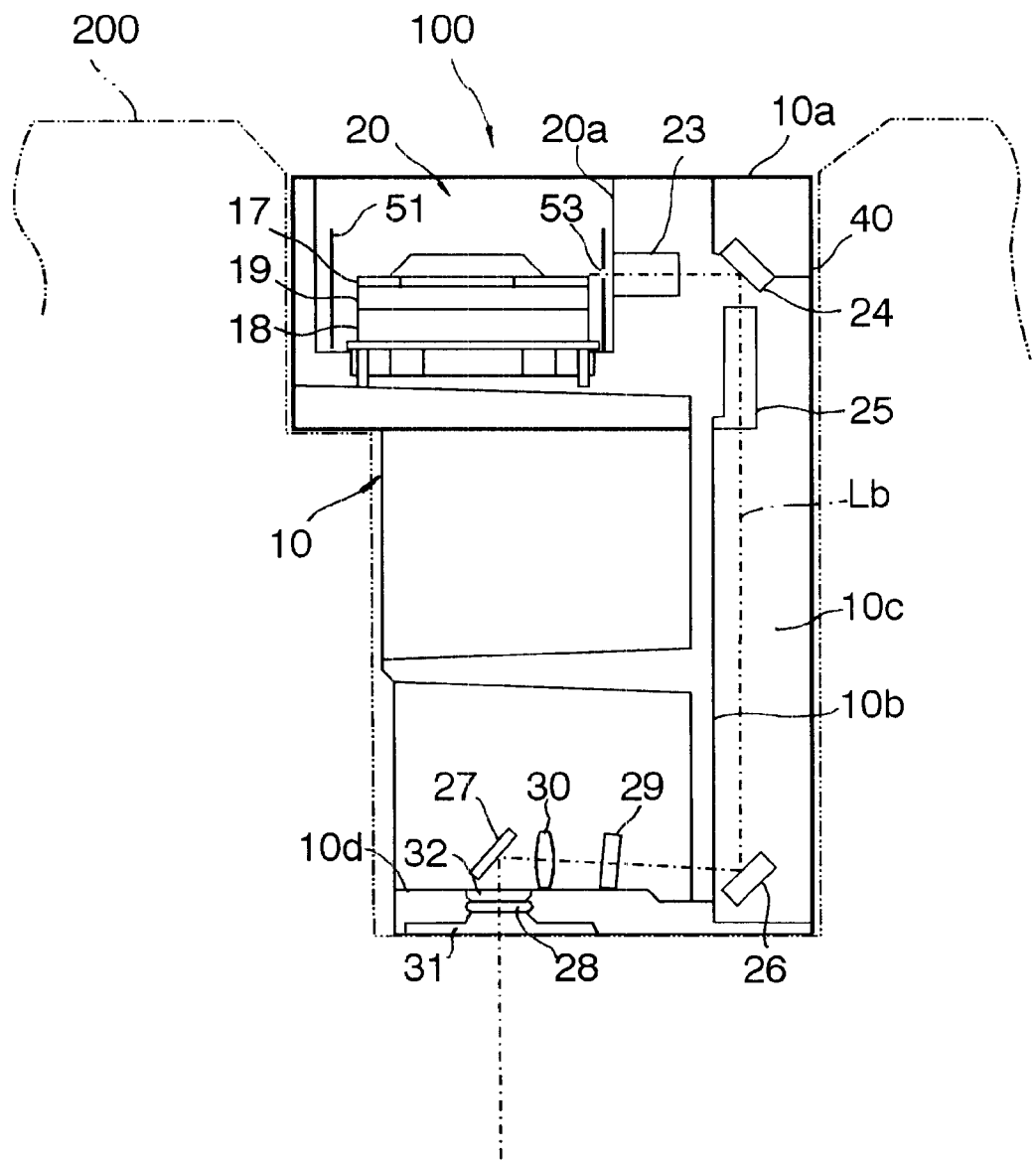
FIG. 3 is cross-sectional view of FIG. 1 taken along a line III—III.

Referring to the drawings in detail, and in particular to FIGS. 1 to 3 showing an optical scanning device 100 equipped with an f-θ lens system in accordance with a preferred embodiment of the present invention, the optical scanning device 100, which is typically is detachably fitted to an instrument such as a printer schematically shown at 200 in FIG. 3, has a generally rectangular parallelepiped box-shaped housing (which is hereafter referred to as a box housing for simplicity) 10. The box housing 10 is provided with a detachable cover 40 which has a generally inverse L-shaped configuration so as to cover the top of the box housing 10 and a rear space defined by the rear wall 10b and extensions of opposite side walls 10c. The box housing 10 at opposite sides is provided with handles 33 and 34 integrally formed therewith for easy handling. Because the optical scanning device 100 has to provide a space sufficiently large for movement of scanning beam between the optical scanning device 100 and an instrument 200 to which the optical scanning device 100 is installed, the box housing 10 is preferably shaped to have a large width in a scanning direction and a small depth in a direction in which the optical scanning device 100 is installed to the related instrument 200. The optical scanning device 100 has a scanning optical system which comprises a polygon mirror 17, a laser beam projection optical system arranged on one side of the polygon mirror 17 close to the laser diode 12, an f-θ lens system arranged on another side of the polygon mirror 17 which is at an angle of approximately right angle with respect to the side facing to the laser beam projection optical system, and a scanning timing control optical system. The optical scanning device 100 further has a light source such as laser diode 12 that is mounted a base board 11 of the box housing 10 so as to project a laser beam Lb along an optical path extending zigzag in a horizontal plane.

The laser beam projection optical system comprises collimator lens 13, a cylindrical lens 14 and a pair of reflection mirrors 15 and 16 stationarily arranged in order from the laser diode 12 so as to direct the laser beam Lb to the polygon mirror 17. The f-θ lens system comprises a first lens element 23, a first reflection mirror 24, a second lens element 25 and a second reflection mirror 26. The polygon mirror 17 is directly and firmly secured to a rotary shaft (not shown) of an electric motor 19 that is mounted on a base board 18 bolted, or otherwise secured, to the box housing 10 and continuously rotated by the electric motor 19 in a counterclockwise direction as shown by an arrow in FIG. 1. As is well known in the art, the polygon mirror 17 reflects the laser beam Lb incident thereupon and deflects it toward the f-θ lens element system.

The box housing 10 is formed with a dust proof chamber 20 for receiving the polygon mirror 17 and the electric motor 19 together with the base board 18 therein, so as thereby to keep the polygon mirror 17 from dust. The dust proof chamber 20 is formed by four side walls 20a and the top cover 40 and has a beam path opening 20b formed at a corner thereof between two adjacent vertical side walls 20a for providing a scanning beam path for the laser beam Lb. On the top of the base board 18 there are arranged a number of electronic parts forming a control circuit (not shown). Because of installation of the motor and the electronic parts in the interior of the dust proof chamber 20, the dust proof chamber 20 is heated to a somewhat high temperature. On account of a rise in temperature of the dust proof chamber 20, the box housing 10 is integrally formed with, or otherwise provided with, a cooling fin arrangement having a plurality of internal cooling fins 21 arranged in the inside thereof and a heat pipe 22 through which the inside of the dust proof chamber 20 is thermally connected to the cooling fin arrangement, so as to cool the inside of the dust proof chamber 20. According to the construction of the dust proof chamber 20, although the electric motor 19 and the electronic parts are sealed within the dust proof chamber 20, the polygon mirror 17 is not only kept from dust but prevented from a rise in temperature with which reflective surfaces of the polygon mirror 17 usually cause distortion. Further, the dust proof chamber 20 is provided with rotational speed variation restraint means 50 for restraining momentary rotational speed variations of the polygon mirror 17 due to turbulence of a current of air that is caused by high speed rotation of the polygon mirror 17 as will be described later.

The scanning optical system has an the f-θ lens system comprising two lens elements, i.e. the first lens element 23 and the second lens element 25, the first and second reflection mirrors 24 and 26. The first reflection mirror 24 is disposed in the optical path between the first and second lens elements 23 and 25, and the second reflection mirror 26 is disposed in the optical path after the second lens element 25. Specifically, as seen in FIG. 3, the first lens element 23 is positioned in front of the beam path opening 20b extending between adjacent two vertical side walls 20a of the dust proof chamber 20 and the second lens element 25 is secured to a rear vertical wall 10b of the box housing 10. The first reflection mirror 24 is disposed at an upper corner of the box housing 10 between the top of the box housing 10 where the first lens element 23 is disposed and the side of the box housing at which the second lens element 25 is and positioned right above the second lens element 25 so as to turn downward the optical path at a right angle. The second reflection mirror 26 is disposed at a bottom corner of the box housing 10 between the bottom of the box housing 10 and the rear vertical wall 10b of the box housing 10 to which the second lens element 25 is secured, so as to turn back the optical path at a right angle. The laser beam Lb reflected and deflected by the polygon mirror 17 passes first through the first lens element 23 forming another part of the f-θ lens system and then reflected and directed downward at a right angle by the first reflection mirror 24. The laser beam Lb directed downward further passes the second lens element 25 forming another part of the f-θ lens system and travels along the rear vertical wall 10b of the box housing 10 until reaching the second reflection mirror 26. Thereafter, the laser beam 12 is reflected and directed backward to the scanning timing control optical system for synchronization of scanning.

As shown in FIGS. 2 and 3, the scanning timing control optical system comprises a reflection mirrors 27 and 29 disposed behind the second reflection mirror 26, and a relay lens element 30 disposed between the reflection mirrors 27 and 29. The scanning timing control optical system is accompanied by an optical sensor 32 such as a photoelectric element covered by a protective transparent glass 28. The reflection mirror 29 is located on a bottom wall 10d of the box casing 10, and the reflection mirror 27 is located on the bottom wall 10d of the box casing 10 as shown in FIG. 3 but slightly off set sideways from the reflection mirror 29 as shown in FIG. 2. Although the reflection mirror 29 is depicted on a straight path of the laser beam for an easy understanding in FIG. 2, it is actually located behind the second reflection mirror 26 as shown in FIG. 3. The reflection mirror 29 is small in size and located in the box housing 10 so as to receive and reflect back the laser beam Lb that is reflected forward by the second reflection mirror 26 at the very moment that the polygon mirror 17 turns and changes its active reflection surface on which the laser beam Lb directed by the laser beam projection optical system impinges from one to another, in other words, to receive only the laser beam Lb reflected by an extreme end of a given effective range of the reflection mirror 26 that is allowed for line scanning. The laser beam Lb reflected by the extreme end of the second reflection mirror 26 (which is hereafter referred to a synchronous laser beam) is reflected by the reflection mirror 29 and directed back to the second reflection mirror 26. Then the synchronous laser beam Lb is reflected again by the second reflection mirror 26 and directed to the reflection mirror 27 through the relay lens element 30 and further reflected downward by the reflection mirror 27 and directed to the optical sensor 32. The optical sensor 32 covered by the protective glass 28 is secured to a base board 31.

In response to reception of the laser beam Lb, the optical sensor 32 provides a control circuit of a printer that is equipped with the optical scanning device 100 with a synchronous signal for a start or an end of each line scanning of a scanning subject medium Sm.

Figure 4A:
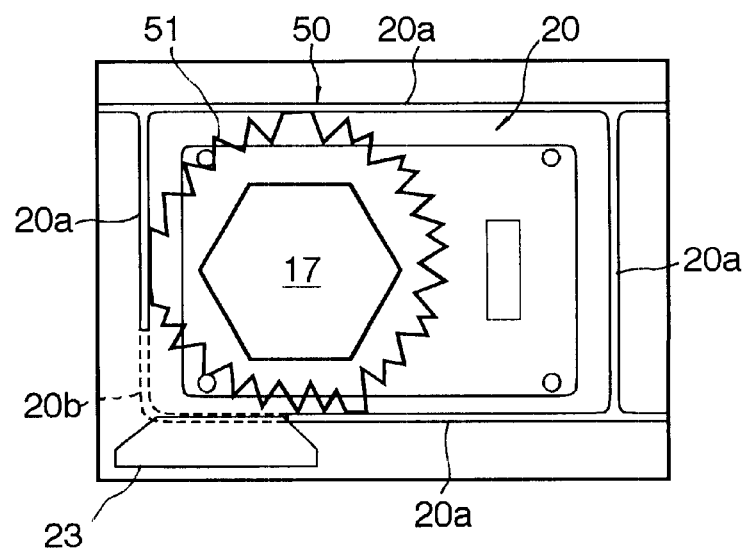
FIG. 4A is a top view of a dust proof chamber equipped with rotational speed variation restraint means of the optical scanning device in accordance with a preferred embodiment of the present invention.
Figure 4B:
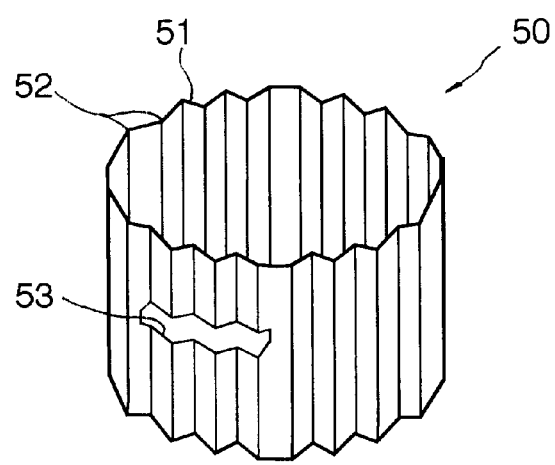
FIG. 4B is a perspective view of a cylindrical partition as the rotational speed variation restraint means.

Referring to FIGS. 4A and 4B showing the rotational speed variation restraint means that surrounds the polygon mirror 17, the rotational speed variation restraint means 50 comprises a cylindrical partition 51 having a number of vertical parallel corrugations 52 and is installed in the dust proof chamber 20 so as to surround almost entirely the polygon mirror 17 by the corrugations 52. The cylindrical partition 51 may be made of any material, optically transparent or opaque. When the cylindrical partition 51 is transparent, it is preferred to have an anti-reflection surface. On the other hand, when the cylinder partition 51 is opaque, it has to be formed with a beam path slot 53 for providing a path for the laser beam Lb.

In operation of the optical scanning device 100 thus constructed, when powering on the optical scanning device 100, directly or indirectly, and exciting the laser diode 12 to generate a laser beam Lb, the optical scanning device 100 is made ready to operate. When the electric motor 19 is actuate, the polygon mirror 17 rotates to continuously and repeatedly reflects the laser beam Lb so as to direct the laser beam Lb to the scanning optical system. The laser beam Lb reflected by the polygon mirror 17 travels through the opening 52 of the cylindrical partition 51 formed with the corrugations 52 of the rotational speed variation restraint means 50 and thereafter through the scanning optical system having a optical path that is turned. Specifically the laser beam Lb travels passing through the first lens element 23 of the f-θ lens system that is directly secured to the dust proof chamber 20 and is subsequently reflected downward by the first reflection mirror 24 located at the rear top corner and travels along the rear vertical wall 10b of the box housing 10. The laser beam Lb reaches the second reflection mirror 26 located at the rear bottom corner of the box housing 10 and is reflected forward toward the back of the box housing 10. At the very moment that the polygon mirror 17 changes it active reflection surface from one to another, the laser beam Lb is directed to the scanning timing control optical system that is located at the bottom 10c of the box housing 10 behind the second reflection mirror 26 for generating a synchronous signal. Immediately thereafter, the laser beam Lb is directed toward a scanning subject medium Sm placed behind the optical scanning device 100 for synchronized line scanning. While the polygon mirror 17 turns through a regular rotational angle θ, the laser beam Lb moves over the given line scanning range A. At every moment that the polygon mirror 17 changes its active reflection surface from one to another, the optical sensor 32 receives a synchronous laser beam Lb and provides a synchronous signal. While the polygon mirror 17 turns through the regular rotational angle θ, the laser beam Lb moves from one extreme end to the another extreme end of the given line scanning range A for line scanning of the scanning subject medium Sm. With continuous rotation of the polygon mirror 17, the laser beam Lb repeats line movement over the given line scanning range.

Figure 5:
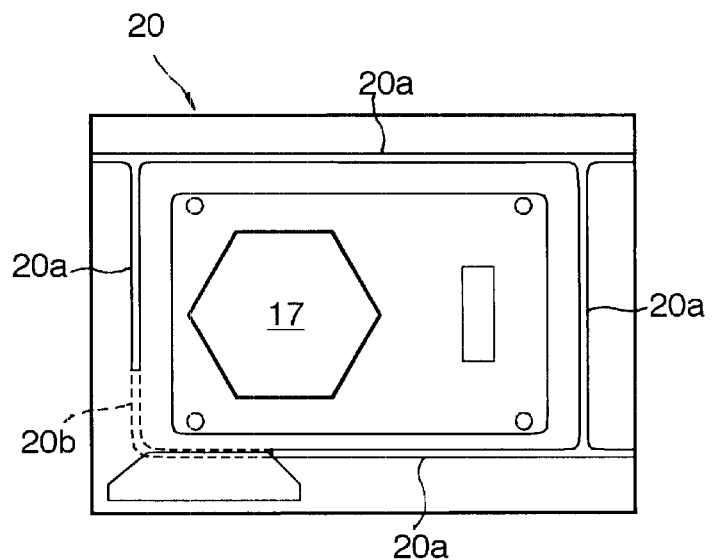
FIGS. 5 to 12 are top views of dust proof chambers equipped with rotational speed variation restraint means provided as comparative examples for measurements of rotational speed variations of the polygon mirror.
Figure 6:
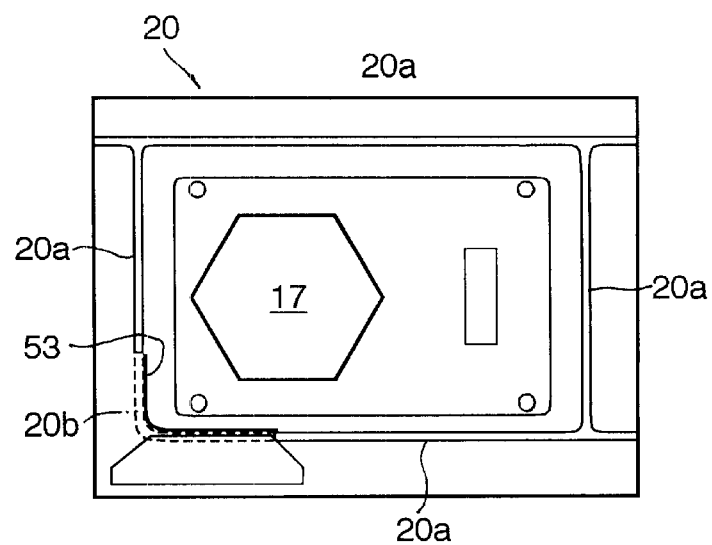
Figure 7:
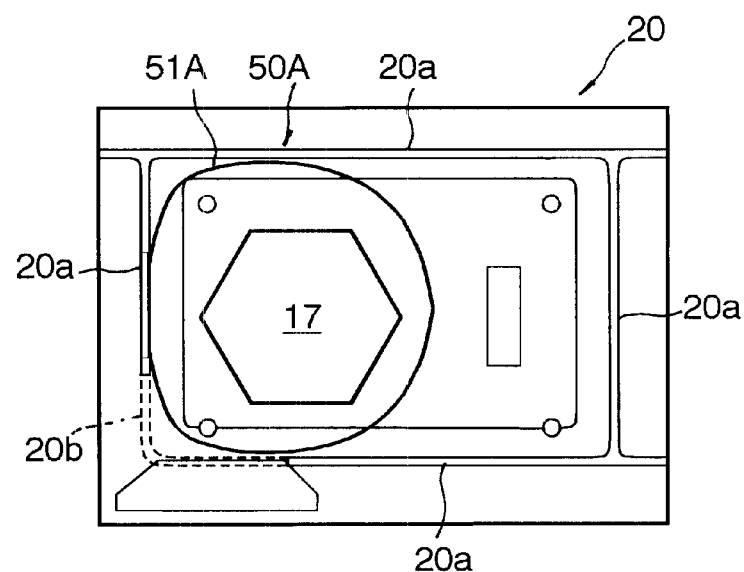
Figure 8:
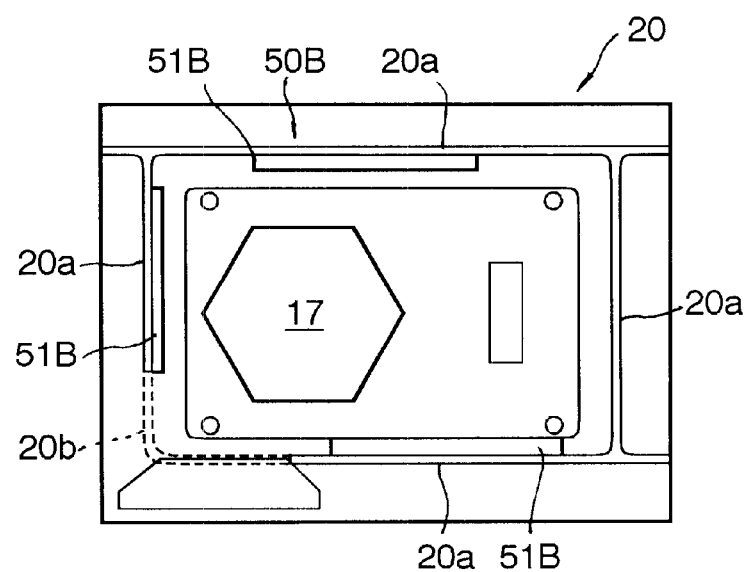
Figure 9:
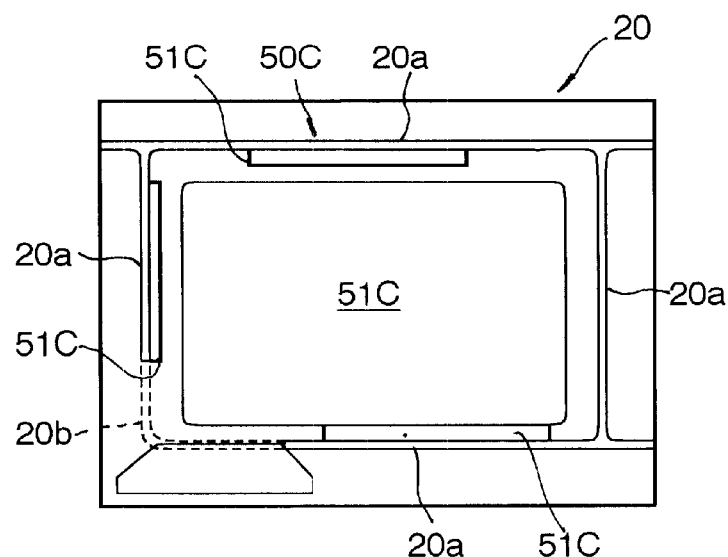
Figure 10:
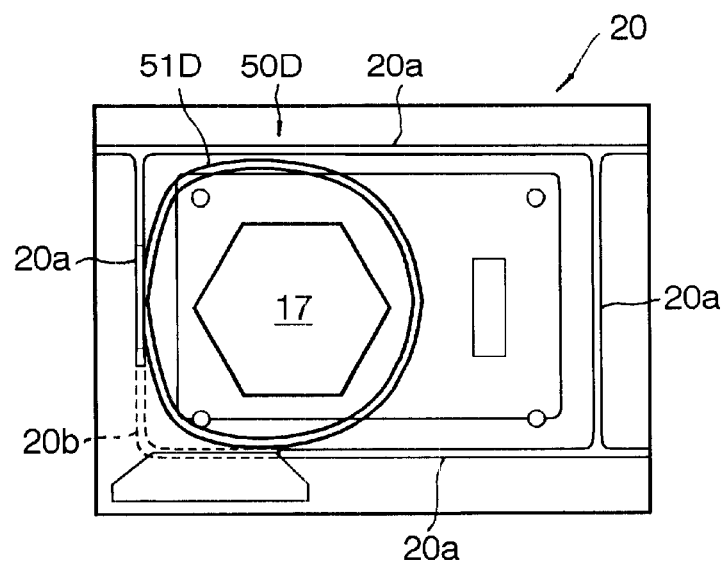
Figure 11:
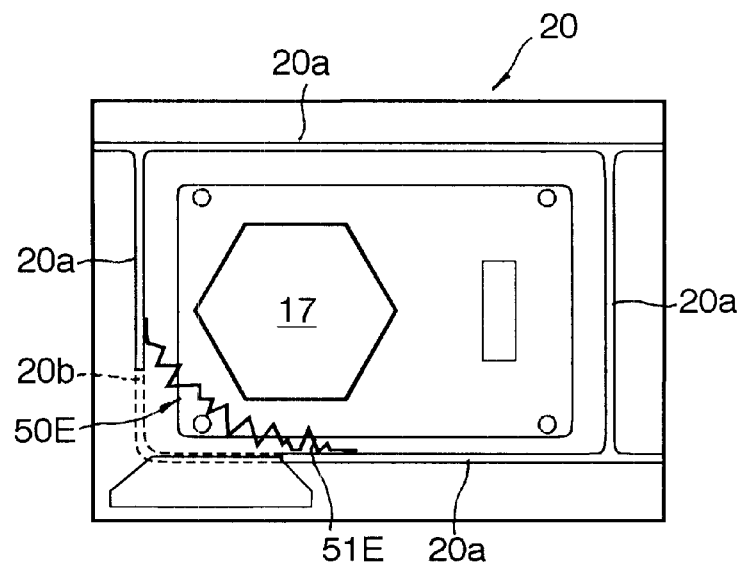
Figure 12:
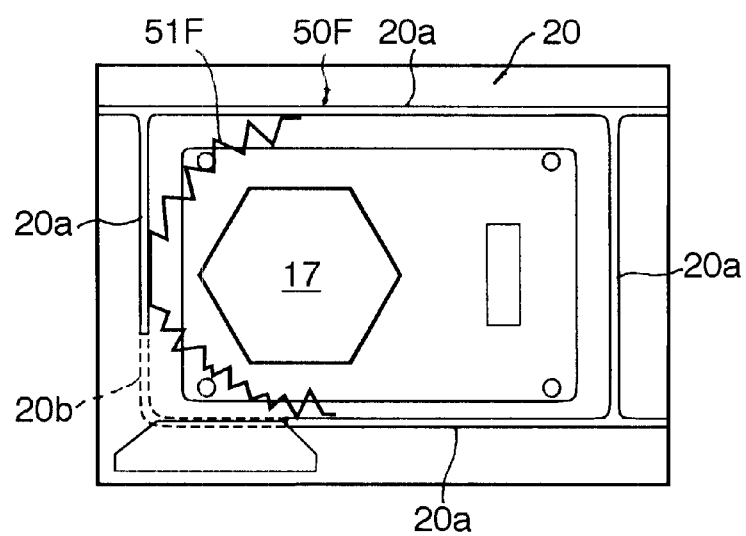

In order to demonstrate the significant effect of the rotational speed variation restraint means 50, the inventors of this application made comparison tests. Precise measurements were made of momentary rotational speed variations of the polygon mirror 17 which was installed in the dust proof chamber 20 with various rotational speed variation restraint means provided as comparative examples I to VIII in addition to the rotational speed variation restraint means in accordance with the embodiment shown in FIGS. 4 and 4A. A dust proof chamber 20 shown as comparative example I in FIG. 5 was provided with no measures for restraining momentary rotational speed variations of the polygon mirror 17. A dust proof chamber 20 shown as comparative example II in FIG. 6 was sealed almost completely hermetically. A dust proof chamber 20 shown as comparative example III in FIG. 7 was provided with rotational speed variation restraint means 50A which comprises a simple cylindrical partition 51A that has an even inner wall and installed in the dust proof chamber 20 so as to surround the polygon mirror 17. A dust proof chamber 20 shown as comparative example IV in FIG. 8 was provided with rotational speed variation restraint means 50B which comprises a rubber sheet 51B that is formed with a large number of holes and affixed to the side walls of the dust proof chamber 20. A dust proof chamber 20 shown as comparative example V in FIG. 9 was provided with rotational speed variation restraint means 50C which comprises a rubber sheet 51C that is formed with a large number of holes and affixed to the side and top walls of the dust proof chamber 20. A dust proof chamber 20 shown as comparative example VI in FIG. 10 was provided with rotational speed variation restraint means 10D which comprises a cylindrical partition 51D made of a rubber sheet formed with a number of holes and installed in the dust proof chamber 20 so as to surround the polygon mirror 17. A dust proof chamber 20 shown as comparative example VII in FIG. 11 was provided with rotational speed variation restraint means 50E which comprises a corrugated sheet partition 51E formed with an beam path slot (not shown) and installed adjacent to the beam path opening 20b of the dust proof chamber 20 so as to block the beam path opening 20b of the dust proof chamber 20. A dust proof chamber 20 shown as comparative example VIII in FIG. 12 was provided with rotational speed variation restraint means 10F which comprises a semi-cylindrical partition 51F having a number of vertical parallel corrugations 52 and is installed in the dust proof chamber 20 so as to surround almost a half of the polygon mirror 17 and blockouts the beam path opening 20b of the dust proof chamber 20.

Measurements of momentary rotational speed variations of the polygon mirror 17 that was in the respective dust proof chambers 20 covered by the top cover 40 were measured on the basis of synchronous signals provided by the optical sensor 32 of the scanning timing control optical system. The measurements is more preferred to implement on the basis of synchronous signals from optical sensors of two scanning timing control optical systems disposed so as to detect opposite extreme ends of line scanning. Further, it is of course possible to use various types of momentary rotational speed variation sensors that are well known to those skilled in the art.

The result of measurements is shown with relative rotational speed variations below.

|  | Speed Variation |
|---|---|
| Embodiment | 17.5 |
| Example I | 44.0 |
| Example II | 30.0 |
| Example III | 29.0 |
| Example IV | 24.0 |
| Example V | 36.0 |
| Example VI | 27.0 |
| Example VII | 27.0 |
| Example VIII | 21.5 |

As is clearly proved from the result, the optical scanning device of the present invention that is provided with the rotational speed variation restraint means provides a significant restraint of rotational speed variation of the polygon mirror which leads to realization of highly precise scanning.

Although the present invention has been fully described by way of the preferred embodiments thereof with reference to the accompanying drawings, other variants and embodiments may occur to those skilled in the art. Unless such variants and mofifications depart from the scopr of the present invention, they are intended to be covered by the following claims.

What is claimed is:

1. An optical scanning device for scanning a subject medium with a scanning beam that is oscillated by a polygon mirror along a straight line on the subject medium, said optical scanning device comprising:
   a housing;
   a polygon mirror installed in said housing; and
   rotational speed variation restraint means for restraining momentary rotational speed variations of said polygon mirror that are caused due to turbulence of a current of air that is caused by high-speed rotation of said polygon mirror;
   wherein said rotational speed variation restraint means comprises a substantially cylindrical partition having a number of corrugations and is placed in said housing so as to entirely surround at least a portion of said polygon mirror by said corrugations.

2. An optical scanning device as defined in claim 1, and further comprising a dust proof chamber formed in said housing for receiving said polygon mirror and said rotational speed variation restraint means.

3. An optical scanning device as defined in claim 1, wherein said substantially cylindrical partition comprises an optically transparent material, the substantially cylindrical partition being arranged with respect to the polygon mirror in the optical scanning device so that the scanning beam passes through the optically transparent material of the substantially cylindrical partition.

4. An optical scanning device as defined in claim 1, wherein said substantially cylindrical partition is opaque and formed with a scanning beam slot, the scanning beam slot being an aperture disposed on the substantially cylindrical partition, the scanning beam slot being entirely surrounded by a material of the substantially cylindrical partition.

5. An optical scanning device as defined in claim 4, wherein the substantially cylindrical partition is arranged with respect to the polygon mirror in the optical scanning device so that the scanning beam passes through the scanning beam slot in the substantially cylindrical partition.

6. An optical scanning device as defined in claim 1, wherein said substantially cylindrical partition is corrugated on both an interior surface and an exterior surface.

7. An optical scanning device for scanning a subject medium with a scanning beam that is oscillated by a polygon mirror along a straight line on the subject medium, said optical scanning device comprising:

a housing;

a polygon mirror installed in said housing; and means for reducing turbulence of a current of air that is caused by high-speed rotation of said polygon mirror;

wherein said means for reducing turbulence comprises a substantially cylindrical partition having a number of corrugations and is placed in said housing so as to entirely surround at least a portion of said polygon mirror by said corrugations.

8. The optical scanning device as defined in claim 7, further comprising a dust proof chamber formed in said housing for receiving said polygon mirror and said means for reducing turbulence.

9. An optical scanning device as defined in claim 7, wherein said substantially cylindrical partition comprises an optically transparent material, the substantially cylindrical partition being arranged with respect to the polygon mirror in the optical scanning device so that the scanning beam passes through the optically transparent material of the substantially cylindrical partition.

10. An optical scanning device as defined in claim 7, wherein said substantially cylindrical partition is opaque and formed with a scanning beam slot, the scanning beam slot being an aperture disposed on the substantially cylindrical partition, the scanning beam slot being entirely surrounded by a material of the substantially cylindrical partition.

11. An optical scanning device as defined in claim 10, wherein the substantially cylindrical partition is arranged with respect to the polygon mirror in the optical scanning device so that the scanning beam passes through the scanning beam slot in the substantially cylindrical partition.

12. An optical scanning device as defined in claim 7, wherein said substantially cylindrical partition is corrugated on both an interior surface and an exterior surface.

* * * * *